United States Patent [19]

Musikas et al.

[11] Patent Number: 4,770,807
[45] Date of Patent: Sep. 13, 1988

[54] NOVEL EXTRACTION AGENTS AND NOVEL PROPANE DIAMIDES

[75] Inventors: Claude Musikas, Bures; Pierre Hoel, Palaiseau; Gérard Thiollet, Cerny; Louisette Lafosse, Vert le Petit, all of France

[73] Assignees: Commissariat a l'Energie Atomique; Institut National de Recherche Chimique Appliquee, both of Paris, France

[21] Appl. No.: 888,583

[22] Filed: Jul. 21, 1986

[30] Foreign Application Priority Data

Jul. 31, 1985 [FR] France .................. 85 11707
Jul. 31, 1985 [FR] France .................. 85 11706

[51] Int. Cl.$^4$ .................. C09K 3/00; C07C 103/14
[52] U.S. Cl. .................. 252/184; 564/160; 423/9
[58] Field of Search .................. 423/9; 564/160; 252/184

[56] References Cited

U.S. PATENT DOCUMENTS

| | | | |
|---|---|---|---|
| 3,857,879 | 12/1974 | Abramitis | 564/160 |
| 3,910,847 | 10/1975 | Thompson | 564/160 |
| 3,946,074 | 3/1976 | Abramitis | 260/561 K |
| 4,036,985 | 7/1977 | Amato et al. | 564/160 |
| 4,143,070 | 3/1979 | Walker | 564/160 |
| 4,360,691 | 11/1982 | Perrin | 564/144 |
| 4,572,802 | 2/1986 | Hubert et al. | 423/9 |
| 4,615,876 | 10/1986 | Troutner et al. | 424/1.1 |

FOREIGN PATENT DOCUMENTS 900605 7/1945 France .

OTHER PUBLICATIONS

Siddall et al, *J. Inorg. Nucl. Chem.*, 29, pp. 149-158, Pergamon Press.
Chemical Abstracts, vol. 87, No. 11, Sep. 12, 1977, p. 546, Ref. No. 84461h, Columbus, Ohio, M. Huys-Francotte et al.: "New Cyanine Synthons from Phosgeniminium Salts and Dicarboxamides or Vinylogous Acetamides" & J. Chem. Res. S. (Synopses) 1977, (4), 100-1 Abrege.

Chemical Abstracts, vol. 91, No. 20, Nov. 12, 1979, p. 398, No. 163698b, Columbus, Ohio, C. Pohlandt et al.: "Extraction of Metal Ions from Chlorine Solution with N,N-Dioctylacetamide" & Talanta 1979, 26(5), 395-9.
Chemical Abstracts, vol. 94, 1981, p. 419, No. 21894a, Columbus, Ohio, G. M. Gasparini et al.: "Application of N,N-Dialkyl Aliphatic Amides in the Separation of Some Actinides" & Sep. Sci. Technol. 1980, 15(4), 825-44.
Chemical Abstracts, vol. 94, 1981, p. 421, No. 21916j, Columbus, Ohio; G. M. Gasparini et al.: "N,N-Dialkyl Substituted Aliphatic Amides as Extractants for Actinides and Fission Products: Preparation and Extractive Properties of N,N-di-n-butyl-2-Ethylhexanimide and N,N-di-n-Hexyloctanamide".
Chemical Abstracts, vol. 89, 1978, p. 454, No. 136514r, Columbus, Ohio, B. N. Laskorin et al.: "Extraction of Uranium and Transuranium Elements by Carboxylic Acid Amides", & Radiokhimiya 1978, 20(4), 511-18.
Chemical Abstracts, vol. 83, 1975, p. 553, No. 172086n, Columbus, Ohio, J. S. Fritz et al.: "Extraction of Metal Ions with N,N-disubstituted Amides" & Anal. Chem. 1975, 47(12), 2043-5.

(List continued on next page.)

Primary Examiner—Edward A. Miller
Attorney, Agent, or Firm—Pearne, Gordon, McCoy & Granger

[57] ABSTRACT

The invention relates to novel extracting agents and novel propane diamides, their use for the recovery of actinides and/or lanthanides and their preparation process. These extracting agents are constituted by propane diamides of formula:

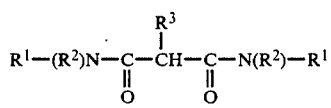

For example, the extracting agent can be 2-hexyl-N,N'-dimethyl-N,N'-dibutyl-propane diamide or 2-ethoxyethyl-N,N'-dimethyl-N,N'-dibutyl-propane diamide. They are more particularly used for the recovery of actinides and/or lanthanides present in the trivalent state in an acid aqueous solution, particularly in a nitric solution.

14 Claims, 5 Drawing Sheets

OTHER PUBLICATIONS

Chemical Abstracts, vol. 72, 1970, p. 385, No. 36404k, Columbus, Ohio, V. S. Schmidt et al.: "Extraction of Various Actinide Elements from Nitric Acid Solutions by N,N-Dialkylacetamides" & Radiokhimiya 1969, 11(5), 593-5.

Hydrometallurgy, vol. 8, No. 4, Jul. 1982, pp. 379-388, Elsevier Scientific Publ. Co., Amsterdam, NL; Zhou Taili et al.: "The Amide Type Extractant A101 and its Application to the Separation of Niobium and Tantalum, and Molybdenus Rheunium".

Chemical Astracts, vol. 94, 1981, p. 422, No. 145962r, Columbus, Ohio, V. Jedinakova et al.: "The Extraction of Lanthanides and Americium by Benzyldialkyl Amides and Benzyltrialkylammonium Nitrates from the Nitrate Solutions; Structure and Aggregation of Their Salts" & Int. Solvent Extr. Conf., [Proc.] 1980, 1, Paper 80-185, 8 pages.

NOVEL EXTRACTION AGENTS AND NOVEL PROPANE DIAMIDES

BACKGROUND OF THE INVENTION

The present invention relates to the extraction of metals by means of extraction agents constituted by propane diamides and it more particularly applies to the recovery of actinides and/or lanthanides present in the trivalent state in an acid aqueous solution, particularly in a nitric solution.

In irradiated nuclear fuel reprocessing installations, during the first uranium and plutonium extraction stage, aqueous solutions of fission products are obtained, which contain relatively large quantities of trivalent ions of lanthanides and actinides. The effluents from these installations also contain the same ions.

In view of the relatively long half-life of trivalent actinide elements, it is of great interest to separate them from nitric aqueous solutions in order to obviate the manipulation of effluents or waste having a high $\alpha$ activity. Hitherto, this separation has been carried out by solvent extraction using as extractants neutral or acid organophosphorus compounds, such as tributyl phosphate or di-2-ethylhexylphosphoric acid. However, the use of such extractants has not proved to be particularly advantageous, because their extraction yield with respect to trivalent ions is low and their industrial use leads to numerous problems due to the necessity of using large amounts of salifying agents, which increases the volume of the waste and the processing costs.

Consideration has also been given to the use for said separation of other neutral or bidentate organophosphorus compounds, such as diphosphonates and carbamyl phosphonates, together with amides, such as is described in J. Inorg. Nucl. Chem. 25, 1963, pp 883–892; J. Inorg. Nucl. Chem. 26, 1964, pp 1991–2003; and Separation Science and Technology, 15, 4, pp 825–844, 1980.

However, the results obtained are not satisfactory, particularly in the case of diamides such as tetrabutyl malonamide, because the extraction yields are very low.

However, research has been carried out on other diamides and it has been found that diamides of formula:

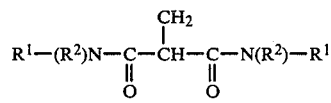

in which R is an alkyl radical with between 2 and 10 carbon atoms made it possible to obtain satisfactory results, as described in French Pat. No. 2 537 326, filed on 1.12.1982 by the Commissariat à l'Energie Atomique. However, such diamides suffer from the disadvantage of mostly being in solid form, which leads to problems in connection with the use thereof.

SUMMARY OF THE INVENTION

The present invention specifically relates to novel extraction agents more particularly usable for the recovery of actinides and/or lanthanides by extraction in an organic solvent containing at least one propane diamide, which obviates the aforementioned disadvantage and which also makes it possible to obtain improved extraction coefficients.

These novel extraction agents are constituted by a propane diamide of formula:

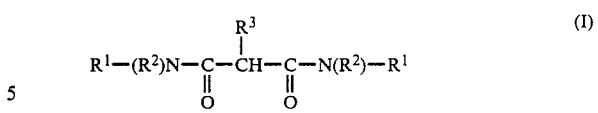

in which $R^1$ and $R^2$, which can be the same or different, represent a straight or branched alkyl radical having 1 to 15 carbon atoms or a radical of formula:

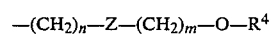

in which $R^4$ is an alkyl radical with 1 to 6 carbon atoms, n is equal to 0 or is an integer ranging between 1 and 6, Z is a single bond or an oxygen atom and m is an integer ranging between 1 and 6, provided that Z is a single bond when n is equal to 0 and $R^3$ represents a hydrogen atom, an alkyl radical with 1 to 15 carbon atoms, a radical of formula:

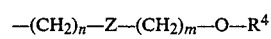

in which n, m, Z and $R^4$ have the meanings given hereinbefore, or a radical of formula:

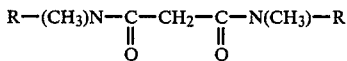

in which $R^1$ and $R^2$ have the meanings given hereinbefore, provided that $R^3$ does not represent a hydrogen atom when $R^1$ and $R^2$ both represent an alkyl radical.

These propane diamides can be used for recovering metals from generally acid aqueous solutions. These metals can belong to the group of transition metals, such as iron and zirconium, to the group of lanthanides or to the group of actinides.

The use for the extraction of metals of propane diamides in accordance with the above formula makes it possible to obtain improved extraction coefficients compared with those obtained with the prior art propane diamides, which are only tetrasubstituted by alkyl radicals.

Preferably, according to the invention, radical $R^1$ is a methyl radical. Preferably, one of the radicals $R^2$ and $R^3$ is a radical in accordance with formula:

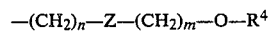

in which m, n, Z and $R^4$ have the meanings given hereinbefore. Thus, the presence of a substituent having at least one other oxide function makes it possible to obtain even better actinide and lanthanide extraction coefficients than those obtained with propane diamides pentasubstituted by alkyl radicals.

According to a preferred embodiment of the invention, the propane diamide is in accordance with formula (I), in which $R^1$ is the methyl radical, $R^2$ an alkyl radical and $R^3$ the radical of formula:

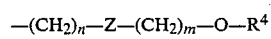

in which n, m, Z and $R^4$ have the meanings given hereinbefore.

In this preferred embodiment, the substituents which can be used can comprise a single ether oxide function. In this case, n is equal to 0, Z is a single bond and preferably m is equal to 1, 2 or 3, whilst R⁴ is an alkyl radical with 2 to 6 carbon atoms.

The substituents which can be used can also have two ether oxide functions. In this case, it is in particular possible to use substituents in which n=2, Z represents an oxygen atom, m is equal to 2 and R⁴ is an alkyl radical with 2 to 6 carbon atoms.

The invention also relates to novel propane diamides according to formula:

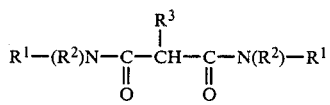

in which R¹ and R², which can be the same or different, represent a straight or branched alkyl radical with 1 to 15 carbon atoms or a radical of formula:

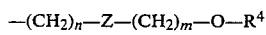

in which R⁴ is an alkyl radical with 1 to 6 carbon atoms, n is equal to 0, or is an integer ranging between 1 and 6, Z is a single bond or an oxygen atom and m is an integer ranging between 1 and 6, provided that Z is a single bond when n is equal to 0 and R³ represents a hydrogen atom, an alkyl radical with 1 to 15 carbon atoms, or a radical of formula:

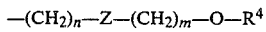

in which n, m, Z and R⁴ have the meanings given hereinbefore, provided that R³ does not represent a hydrogen atom or an alkyl radical having 1 to 3 carbon atoms when R¹ and R² both represent an alkyl radical.

Preferably, at least one of the radicals R¹, R² and R³ complies with the formula:

in which n, m, Z and R⁴ have the meanings given hereinbefore.

When R³ represents a hydrogen atom, tetrasubstituted propane diamides are obtained. Examples of such propane diamides are N,N'-dimethyl-N,N'-dioctoxyethyl-propane diamide of formula:

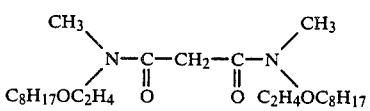

when R³ differs from a hydrogen atom, pentasubstituted propane diamides are obtained. Examples of such propane diamides are propane diamides of formula (I), in which R¹ is the methyl radical, R² the butyl radical and R³ a radical chosen from among the ethoxyethyl, butoxyethyl, hexoxyethyl and hexoxyethoxyethyl radicals and the propane diamide for formula (I) in which R¹ is the methyl radical, R² the octyl radical and R³ the hexoxyethyl radical.

These propane diamides are particularly interesting, because the presence of an ether oxide function on one of the substituents makes it possible to obtain improved properties for the extraction of actinides and lanthanides.

According to the invention, the propane diamide can also be a propane diamide pentasubstituted by alkyl radicals. Examples of such compounds are propane diamides in accordance with formula (I), in which R¹ is the methyl radical, R² the butyl radical and R³ the butyl or hexyl radical.

The propane diamides according to the invention can be in the form of a mixture of isomers or in the form of isomers. Furthermore, it is pointed out that the formulas given herein can either represent a mixture of isomers or one of the isomers.

The novel extraction agents based on pentasubstituted propane diamides according to the invention can be prepared by a four stage process on the basis of an alkyl malonate. In the first stage, to the alkyl malonate is fixed the radical of formula R³ by the reaction of the alkyl malonate with a halide of formula R³X in the presence of sodium, which corresponds to the following reaction diagram:

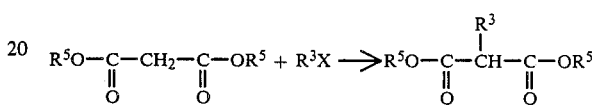

in which R⁵ represents an alkyl radical.

In the second stage, hydrolysis takes place of the branched malonate obtained in the first stage by means of soda or potash, which corresponds to the following reaction diagram:

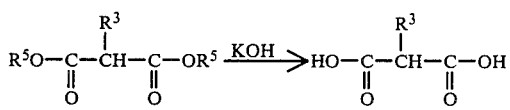

The thus obtained substituted malonic acid is then transformed into malonyl chloride by reaction thereof with SOCl₂, which corresponds to the following reaction diagram:

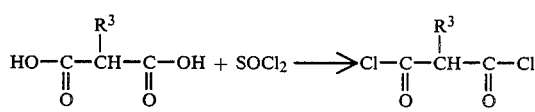

After these reactions, there is an amination of the malonyl chloride by reacting the latter with the corresponding amine of formula

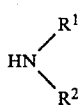

which corresponds to the following diagram:

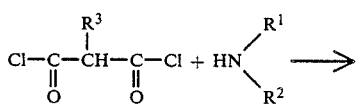

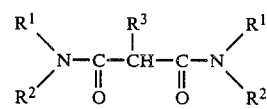

The halides of formula R³X used when R³ contains an ether oxide group can be prepared by conventional processes, e.g. by the process described by F. C. Cooper and M. W. Partridge in J. Chem. Soc., 1950, p 459. However, this procedure for preparing pentasubstituted propane diamides suffer from the disadvantage of requiring several stages.

The present invention also proposes a process for the preparation of pentasubstituted propane diamides making it possible to obviate this disadvantage. This process for the preparation of a pentasubstituted propane diamide according to formula:

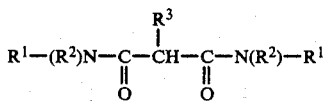
(I)

in which $R^1$, $R^2$ and $R^3$ have the meanings given hereinbefore, consists of reacting a tetrasubstituted propane diamide of formula:

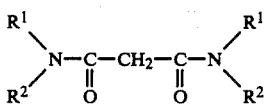
(III)

in which $R^1$ and $R^2$ have the meanings given hereinbefore with a halide of formula $R^3X$, in which X represents a halogen atom, in the presence of metallation agents, e.g. n-butyl lithium or t-butyl lithium.

In this process, the halides of formula $R^3X$ are preferably bromides or iodides and they can be prepared, when $R^3$ contains an ether group, by using the process described by F. C. Cooper and M. W. Partridge in J. Chem. Soc., 1950, p 459.

In the process according to the invention, there is firstly a metallation reaction of the tetrasubstituted propane diamide, e.g. by n or t-butyl lithium in accordance with the following reaction diagram:

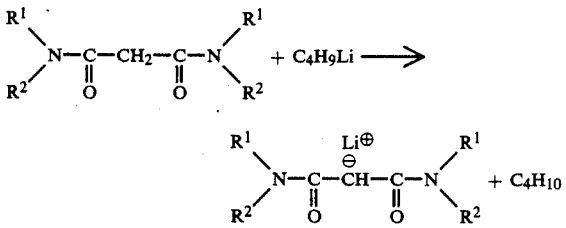

and then the halide of formula $R^3X$ is condensed on the product formed during the metallation reaction in accordance with the following reaction diagram:

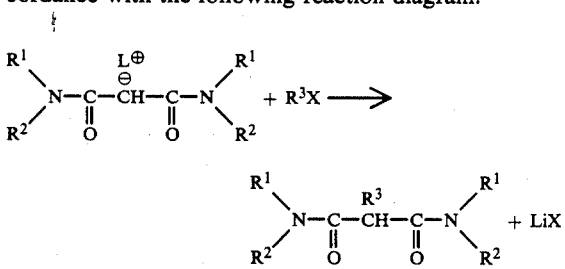

The tetrasubstituted propane diamides used as the starting product in the process according to the invention can be prepared by the amination of the malonyl chloride by means of corresponding amines of formula

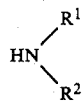

using the reaction described hereinbefore in the case of substituted malonyl chlorides. This reaction is generally performed in the presence of a catalyst, such as triethyl amine. This procedure for the preparation of tetrasubstituted propane diamides still suffers from the disadvantage of leading to very low yields, when the hydrocarbon chains $R^1$ and/or $R^2$ of the amine have more than four carbon atoms.

Furthermore, the present invention proposes another process for the preparation of tetrasubstituted propane diamides making it possible to obtain good yields, even when the radicals $R^1$ and/or $R^2$ of the amine have more than 4 carbon atoms.

According to the invention, preparation takes place of tetrasubstituted propane diamides of formula:

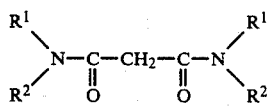
(III)

in which $R^1$ and $R^2$ have the meanings given hereinbefore, by reacting an alkyl malonate of formula:

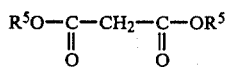

in which $R^5$ represents an alkyl radical, with the corresponding amine of formula

in the presence of a catalyst.

This corresponds to the following reaction diagram:

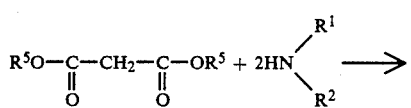

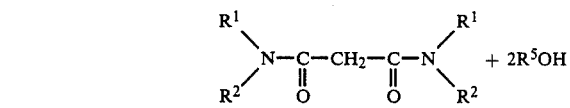

Generally, the alkyl malonate is ethyl malonate and the reaction takes place in the presence of a catalyst such as hydroxypyridine, operating at a temperature above ambient temperature and e.g. at 140° to 170° C.

The starting amines used for the preparation of the tetrasubstituted propane diamides and pentasubstituted propane diamides can be prepared by conventional processes, particularly that described by J. L. Nelson and RC. Sentz in J. Amer. Chem. Soc. vol. 74, p 1704, 1952.

The inventive process for the preparation of pentasubsituted propane diamides thus has the advantage of making it possible to obtain such products in two stages from commercial products, such as ethyl malonate and the halide of formula $R^3X$. Moreover, the process according to the invention is advantageous because it places the critical branching stage, i.e. the introduction of radical $R^3$, last, whereas it is performed first in the four stage synthesis process.

When the extraction agent corresponds to formula:

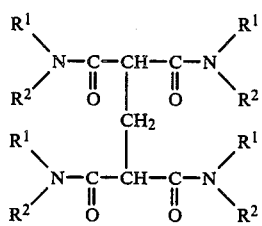

(II)

in which $R^1$ and $R^2$ can be the same or different and represent a straight or branched alkyl radical with 1 to 15 carbon atoms or a radical of formula:

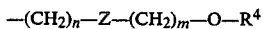

in which $R^4$ is an alkyl radical with 1 to 6 carbon atoms, n is equal to 0 or is an integer ranging between 1 and 6, Z is a single bond or an oxygen atom and m is an integer ranging between 1 and 6, provided that Z is a single bond when n=0, the process consists of reacting a tetrasubstituted propane diamide of formula:

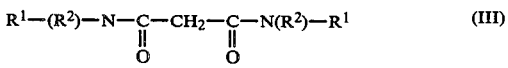

(III)

in which $R^1$ and $R^2$ have the meanings given hereinbefore with a methoxyalkyl halide of formula $XCH_2OR$, which X represents a halogen atom and R an alkyl radical with 1 to 8 carbon atoms, e.g. a methoxymethyl halide of formula $XCH_2-OCH_3$, in the presence of a metallation agent, such as n-butyl lithium or t-butyl lithium.

Under these conditions two tetrasubstituted propane diamide molecules react with a methoxyalkyl halide in which the alkyl contains 1 to 8 carbon atoms, e.g. a methoxymethyl halide, generally bromide, for forming the pentasubstituted propane diamide according to formula (II).

When use is made of the processes described hereinbefore, the product obtained is constituted by a mixture of isomers.

According to the invention, the extraction agent used can be one of three isomers or a mixture thereof and it is pointed out that the formulas given herein can either represent one of these isomers or the mixture of isomers obtained by the processes described hereinbefore.

The invention more particularly applies to the recovery of actinides and/or lanthanides present in the trivalent state in an acid aqueous solution.

The invention also relates to a process for the recovery of actinides and/or lanthanides present in the trivalent state in an acid aqueous solution, which consists of contacting said aqueous solution with an organic phase comprising at least one extraction agent chosen from among the extraction agents based on propane diamides according to formula (I).

According to the invention, the organic phase used for extraction purposes generally comprises a diluent and the propane diamide concentration of the organic phase is preferably 0.1 to 1.5 mol.$l^{-1}$.

Thus, the extraction rate generally increases with the propane diamide concentration of the organic phase. However, to maintain the viscosity and density of the organic phase in an appropriate range, use is generally made of propane diamide contents not exceeding 1.5 mol.$l^{-1}$.

The diluents which can be used are inert organic diluents preferably having a not very high dielectric constant. Examples of such diluents are benzene, xylene, mesitylene, t-butyl benzene, dodecane and mixtures thereof.

Generally the diluent used is a mixture of decanol and a compound chosen from among benzene, xylene, mesitylene, t-butyl benzene and dodecane, because the presence of decanol makes it possible to avoid the formation of a third phase for low concentrations of lanthanides or actinides extracted in the organic phase. However, so as not to excessively reduce the extraction yield, the organic phase generally comprises at the most 20% by volume of decanol.

The process according to the invention can be used for recovering actinides and lanthanides from different aqueous solutions, but in particular nitric solutions.

The process according to the invention can be performed in any conventional extraction apparatus, such as groups of mixer-settler means, pulsed columns, centrifugal extractors, etc. Generally, working takes place at ambient temperature and pressure with aqueous phase:organic phase volume ratios between 10:1 and 1:10.

The actinides (III) and lanthanides (III) extracted in the organic phase can then be recovered with very good yields by reextraction in water.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
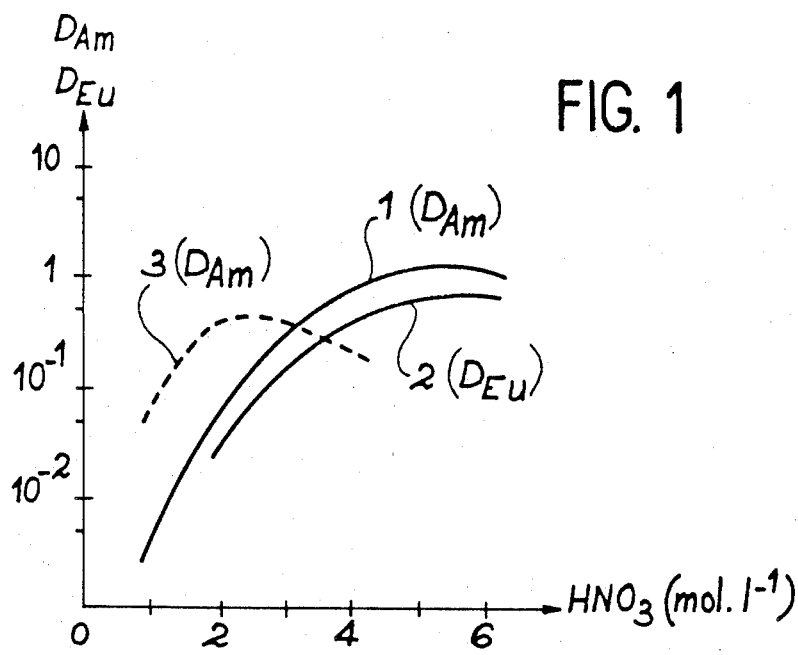
FIGS. 1 and 2. Graphs showing the variations of the distribution coefficients $D_{Am}$ of americium and $D_{Eu}$ of europium, as a function of the nitric acid concentration of the aqueous solution to be treated, when using as the organic extractant 2-hexyl-N,N'-dimethyl-N,N'-dibutyl-propane diamide (FIG. 1) and 2-ethoxyethyl-N,N'-dimethyl-N,N'-dibutyl-propane diamide (FIG. 2), at concentrations of 0.5 mol.$l^{-1}$ in a diluent of 90% t-butyl benzene and 10% decanol.

Examples 1 and 2 illustrate the preparation of tetrasubstituted propane diamides.

Examples 3 to 7 illustrate the preparation of pentasubstituted propane diamides using the process according to the invention and the novel compounds obtained by this process.

Examples 8 to 17 illustrate the use of the propane diamides according to the invention for the extraction of actinides and lanthanides.

EXAMPLE 1

Preparation of N,N'-dimethyl-N,N'-dioctyl-propane diamide (compound 1) of formula:

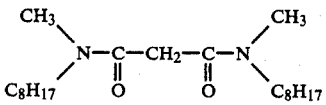

0.30 mol of ethyl malonate, 0.225 ml of 2-hydroxypyridine and 1.44 mol of methyl-N-octyl-amine are placed in a one liter reactor, scavenged by a nitrogen stream and equipped with a Vigreux column, a condenser and a receiving flask. Progressive heating takes place and at 175° C. ethyl alcohol is separated on the oil bath. Heating is continued until the end of alcohol separation (185° C. on the oil bath). Cooling takes place, followed by taking up with 300 ml of chloroform, washing with water to eliminate the pyridine, settling, drying, removing the solvent and distillation. After distilling the starting amine (72°–75° C./15 mm Hg) (2025 Pa), the sought product distils at 185°–190° C. under 0.1 mm Hg (13.5 Pa). 55 g of a yellow liquid are recovered with a yield of 52%. The product crystallizes in hexane at +5° C. (m.p.=41° C.) it being characterized by the nuclear magnetic resonance of the proton and by potentiometry.

EXAMPLE 2

In the same way as in example 1 are prepared the tetrasubstituted propane diamides (compounds 2 to 5 of the following table) using ethyl malonate and amines corresponding to formula

The yields obtained and the boiling points of the tetrasubstituted propane diamides are also given in table 1. It also provides the results obtained with the tetrasubstituted propane diamide of example 1 (compound 1).

TABLE 1

Propane diamide of formula $$\begin{array}{c}R^1 \\ \diagdown \\ N-C-CH_2-C-N \\ \diagup \quad \| \quad \| \quad \diagdown \\ R^2 \quad O \quad O \quad R^2 \end{array} \begin{array}{c} R^1 \\ \diagup \\ \\ \end{array}$$

| Compound No. | R$^1$ | R$^2$ | Yield | b.p. |
|---|---|---|---|---|
| 1(DIAM 8) | CH$_3$ | C$_8$H$_{17}$ | 52% | 185–190° C./1 mm (135 Pa) |
| 2(DIAM 6) | CH$_3$ | C$_6$H$_{13}$ | 30% | 170–175° C./0.5 mm (67.5 Pa) |
| 3(DIAM 4,8) | C$_4$H$_9$ | C$_8$H$_{17}$ | 25% | — |
| 4(DIAM 4,4) | C$_4$H$_9$ | C$_4$H$_9$ | 47% | 172–177° C./1 mm (135 Pa) |
| 5(DIAM 802) | CH$_3$ | C$_2$H$_4$OC$_8$H$_{17}$ | 50% | — |

EXAMPLE 3

Preparation of 2-hexyl-N,N'-dimethyl-N,N'-dibutyl-propane diamide (2-HDBDMPDA) (compound 6)

(a) preparation of N,N'-dimethyl-N,N'-dibutyl-propane diamide of formula:

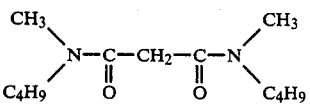

2 mol of N-methyl-N-butyl amine in 600 ml of methylene chloride are introduced into a two liter reactor scavenged by a nitrogen stream. 2 mol of triethyl amine are added to trap the hydrochloric acid. Pouring then takes place at 5° C. of a malonyl chloride solution prepared from 1 mol of malonyl chloride in 300 ml of methylene chloride and following the addition of the said solution, refluxing of the methylene chloride takes place for 4 hours. Cooling is followed by filtration, abundant washing with water to eliminate the triethylamine hydrochloride, drying the organic phase, expelling the solvent and distillation. In this way 97 g of a liquid is recovered, which distills at 140°–144° C. under 0.3 mm of mercury (40.5 Pa), which corresponds to a 40% yield. This product crystallizes in hexane at 5° C. (m.p. 51.5° C.). This product is characterized by nuclear magnetic resonance of the proton and by potentiometric dosing and it is established that it corresponds to the above formula.

(b) Preparation of 2-hexyl-N-N'-dimethyl-N,N'-dibutyl-propane diamide of formula:

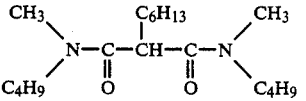

0.1 mol of N,N'-dimethyl-N,N'-dibutyl-propane diamide dissolved in 400 ml of tetrahydrofuran are introduced into a one liter reactor, scavenged by a nitrogen stream. Cooling takes place to −50° C. using an acetone bath and solid carbon dioxide and pouring takes place of a solution of n-butyl lithium prepared from 0.1 mol of n-butyl lithium in 100 ml of anhydrous tetrahydrofuran. Under the same conditions is poured a solution of hexyl iodide prepared from 0.1 mol of hexyl iodide and 100 ml of anhydrous tetrahydrofuran. When pouring is at an end, the temperature is allowed to rise to ambient temperature again, followed by refluxing the tetrahydrofuran for three hours. Cooling is allowed to take place, followed by hydrolysis with a water-ethanol mixture. The tetrahydrofuran is expelled and in this way a precipitate is formed. This is taken up with methylene chloride, followed by washing with water, drying the organic layer, expelling the solvent and then distillation. The boiling point is 145° to 148° C. under 0.4 mm of mercury and the product is a yellow liquid. Its characterization by nuclear magnetic resonance of the proton and by potentiometric dosage confirms that it corresponds to the above formula.

The following were prepared in the same way: 2,N,N'-trimethyl-N,N'-dibutyl-propane diamide, 2-ethyl-N,N'-dimethyl-N,N'-dibutyl-propane diamide and 2,N,N'-trimethyl-N,N'-dioctyl with respectively yields of 66%, 61.5% and 65.2% from the N,N'-dimethyl-N,N'-dibutyl-propane diamide obtained in example 3a) or N,N'-dimethyl-N,N'-dioctyl-propane diamide obtained in example 1 using as halides methyl iodide or ethyl iodide.

EXAMPLE 4

Preparation of 2-butyl-N,N'-dimethyl-N,N'-dibutyl-propane diamide (compound 7).

As in example 3(a), N,N'-dimethyl-N,N'-dibutyl-propane diamide was prepared and was then reacted by following the operating procedure of example 3(b) with butyl iodide. This gave 2-butyl-N,N'-dimethyl-N,N'-dibutyl-propane diamide with a yield of 47.6%.

EXAMPLE 5

Preparation of 2-ethoxyethyl-N,N'-dimethyl-N,N'-dibutylpropane diamide (2-(3-OP)DBDMPDA) (compound 8) of formula:

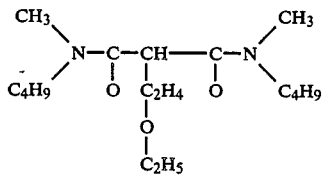

0.1 mol of N,N'-dimethyl-N,N'-dibutyl-propane diamide obtained in example 3(a) dissolved in 400 ml of anhydrous tetrahydrofuran were introduced into a one liter reactor, scavenged by an argon flow. Cooling took place to −50° C. using an acetone bath and solid carbon dioxide and pouring took place of a solution of n-butyl lithium prepared from 0.1 mol of n-butyl lithium in 100 ml of anhydrous tetrahydrofuran. Under the same conditions was prepared a solution of ethoxy-2-ethyl bromide of formula $BrCH_2-CH_2-O-C_2H_5$ prepared from 0.1 mol of bromide and 100 ml of anhydrous tetrahydrofuran. With pouring at an end, the temperature was allowed to rise to ambient temperature, followed by refluxing the tetrahydrofuran for three hours. This was followed by cooling and hydrolysis with a water-ethanol mixture. The tetrahydrofuran was expelled and a precipitate formed, followed by taking up with methylene chloride. This was followed by washing with water, drying the organic layer, expelling the solvent before performing chromatography on a silica gel column using as the eluent a mixture of ethyl acetate and cyclohexane (80:20 by volume). A yellow liquid was recovered constituted by 2-ethoxyethyl-N,N'-dimethyl-N,N'-dibutyl-propane diamide. The product was characterized by mass spectrometry, magnetic resonance of the proton and potentiometry, the eld was 40%.

EXAMPLE 6

In the same way as in example 5, the pentasubstituted propane diamides were prepared (compounds 9 to 12 of table 2) by reacting the N,N'-dimethyl-N,N'-dibutyl-propane diamide obtained example 3 with the corresponding bromides in the case of compounds 9 to 11, or N,N'-dimethyl-N,N'-dioctyl-propane diamide obtained in example 1 with the corresponding alkyl bromide in the case of compound 12.

The yields obtained are also given in table 2, which also gives the results obtained with the pentasubstituted propane diamide of example 5 (compound 8).

In the case of compound 11 of table 2, use was also made of a purification procedure other than silica gel column chromatography. This purification treatment was performed in the following way. 200 g of crude product was stirred with 2 liters of 1N hydrochloric acid for 24 hours, followed by settling. This operation was repeated three times and the organic part was taken up in 200 ml of methylene chloride, followed by washing with water and flash distillation. This gave a 98% pure product with a yield of 40%. This purification procedure was also used for the other compounds of table 2.

TABLE 2

| Compound | $R^1$ | $R^2$ | $R^3$ | Yield |
|---|---|---|---|---|
| No. 8 | $CH_3$ | $C_4H_9$ | $C_2H_4OC_2H_5$ | 40% |
| No. 9 | $CH_3$ | $C_4H_9$ | $C_2H_4OC_4H_9$ | 52.7% |
| No. 10 | $CH_3$ | $C_4H_9$ | $C_2H_4OC_6H_{13}$ | 55.6% |
| No. 11 | $CH_3$ | $C_4H_9$ | $C_2H_4OC_2H_4OC_6H_{13}$ | 40.5% |
| No. 12 | $CH_3$ | $C_8H_{17}$ | $C_2H_4OC_6H_{13}$ | 51% |
| No. 14 | $CH_3$ | $C_4H_9$ | $C_2H_4OC_2H_4OC_8H_{17}$ | 60% |
| No. 15 | $CH_3$ | $C_4H_9$ | $C_2H_4OC_2H_4OCH_2-CH-C_4H_9$ $\quad\quad\quad\quad\quad\quad\quad\quad\quad\;\; \|$ $\quad\quad\quad\quad\quad\quad\quad\quad\quad C_2H_5$ | 55% |

EXAMPLE 7

Preparation of bis-[N,N'-dimethyl-N,N'-dibutyl-propane diamide]-2,2-methylene (compound 13) of formula:

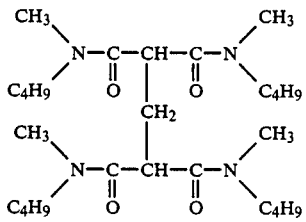

0.1 mol of N,N'-dimethyl-N,N'-dibutyl-propane diamide obtained in example 3(a) and dissolved in 400 ml of anhydrous tetrahydrofuran (THF) were introduced into a one liter reactor, scavenged by an argon flow. Cooling took place to −50° C. using an acetone-solid carbon dioxide bath and pouring took place of a solution of n-butyl lithium prepared from 0.1 mol of n-butyl lithium in 100 ml of anhydrous THF. Under the same conditions, pouring took place of a bromo methoxy methane solution prepared from 0.1 mol of bromide in 100 ml of anhydrous THF. With pouring at an end, the temperature was allowed to rise to ambient temperature and then the THF was refluxed for three hours. Cooling was allowed to take place, followed by hydrolysis with a water-ethanol mixture. The THF was expelled and the residue taken up with methylene chloride. This was followed by washing with water, drying the organic layer and expelling the solvent before carrying out silica gel chromatography using as the eluant a mixture of ethyl acetate and cyclohexane (80:20 by volume). 15.8 g of a very viscous yellow product were recovered (yield=63.4%).

This product was characterized by mass spectrometry, nuclear magnetic resonance of the proton and potentiometry.

EXAMPLE 8

This example illustrates the recovery of americium and europium respectively present at concentrations of $10^{-4}$ mol.l$^{-1}$ for Am (III) and $10^{-2}$ mol.l$^{-1}$ for Eu (III) in nitric aqueous solutions of different acidities.

In all cases, use was made of an organic phase constituted by propane diamide formed by compound 6 obtained in example 3 (2-HDBDMPDA) dissolved in a mixture of t-butyl benzene and decanol (90% by volume t-butyl benzene and 10% by volume of decanol), the diamide concentration of the organic phase being 0.5 mol.l$^{-1}$. In this example, extraction takes place by contacting under stirring the organic phase and the aqueous phase containing the americium and europium with an organic phase:aqueous phase volume ratio of 1.

Following 4 minutes contacting accompanied by stirring, the phases are allowed to settle and the americium and europium concentrations of the aqueous and organic phases are measured. In this way it is possible to determine the distribution coefficients of the americium and europium $D_{Am}$ and $D_{Eu}$ corresponding to the ratio of the concentration of the element (Am or Eu) in the organic phase to the concentration of the same element in the aqueous phase. The results obtained are given in FIG. 1, where curves 1 and 2 respectively illustrate the variations of $D_{Am}$ and $D_{Eu}$ as a function of the nitric acid concentration of the aqueous phase (in mol.l$^{-1}$).

In FIG. 1, curve 3 (in dotted line form) illustrates the results obtained with regards to the americium distribution coefficient, when extraction is carried out under the same conditions using the prior art N,N'-dimethyl-N,N'-dioctylpropane diamide.

These results show that the distribution coefficients of americium and europium increase with the nitric acid concentration of the aqueous phase and they have a maximum for a for a nitric acid concentration of approximately 5 mol.l$^{-1}$. In the case of the prior art propane diamide (curve 3), the americium distribution coefficient has a maximum for a nitric acid concentration of 2 mol.l$^{-1}$, but this maximum is below that obtained with the diamide according to the invention.

EXAMPLE 9

This example also relates to the extraction of the americium and europium respectively present at concentrations of $10^{-4}$ mol.l$^{-1}$ for Am (III) and $10^{-2}$ mol.l$^{-1}$ for Eu (III) in the nitric aqueous solutions of different acidities using propane diamide constituted by compound 8 obtained in example 5 (2-(3-OP)DBDMPDA).

In all cases, use is made of an organic phase constituted by the diamide obtained in example 5, i.e. 2-ethoxyethyl-N,N'-dimethyl-N,N'-dibutyl-propane diamide (2-(3-OP)DBDMPDA) at a concentration of 0.5 mol.l$^{-1}$ in an organic phase having 90% by volume of t-butyl benzene and 10% by volume of decanol. Extraction of the europium and americium takes place under the same conditions as in example 8 and after 4 minutes contacting time, the americium and europium concentrations of the aqueous phase and organic phase are measured. The americium and europium distribution coefficients are then determined.

Figure 2:
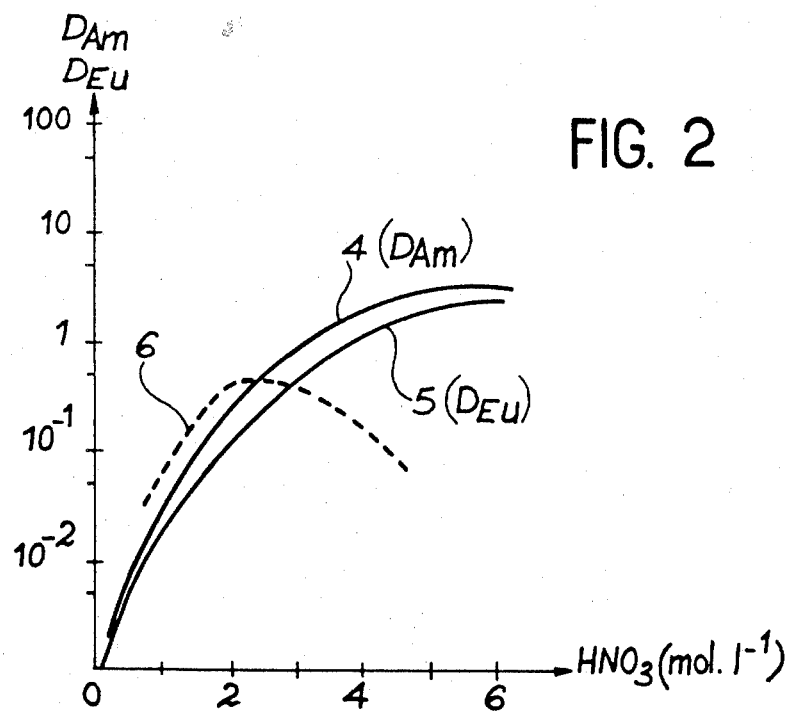

The results obtained are given in FIG. 2, where curves 4 and 5 respectively illustrate the distribution coefficients $D_{Am}$ and $D_{Eu}$, as a function of the nitric acid concentration of the aqueous phase (in mol.l$^{-1}$).

In FIG. 2, the dotted line curve 6 relates to the results obtained under the same conditions for americium with the prior art N,N'-dimethyl-N-N'-dioctyl-propane diamide (DODMPDA). It is possible to see that the americium and europium distribution coefficient increases with the nitric acid concentration of the aqueous phase and that the best distribution coefficients are obtained for nitric acid concentrations of 5 to 6 mol.l$^{-1}$.

When using the prior art propane diamide (curve 6) the maximum extraction coefficient for americium is obtained for nitric acid concentrations of 2 to 3 mol.l, but this maximum is well below the maximum obtained with the propane diamide according to the invention.

EXAMPLE 10

This example also relates to the recovery of the americium and europium present in the trivalent state in an aqueous nitric phase having a HNO$_3$ concentration of 5 mol.l$^{-1}$, Am (III) concentration of $10^{-4}$ mol.l$^{-1}$ and a Eu (III) concentration of $10^{-2}$ mol.l$^{-1}$.

Figure 3:
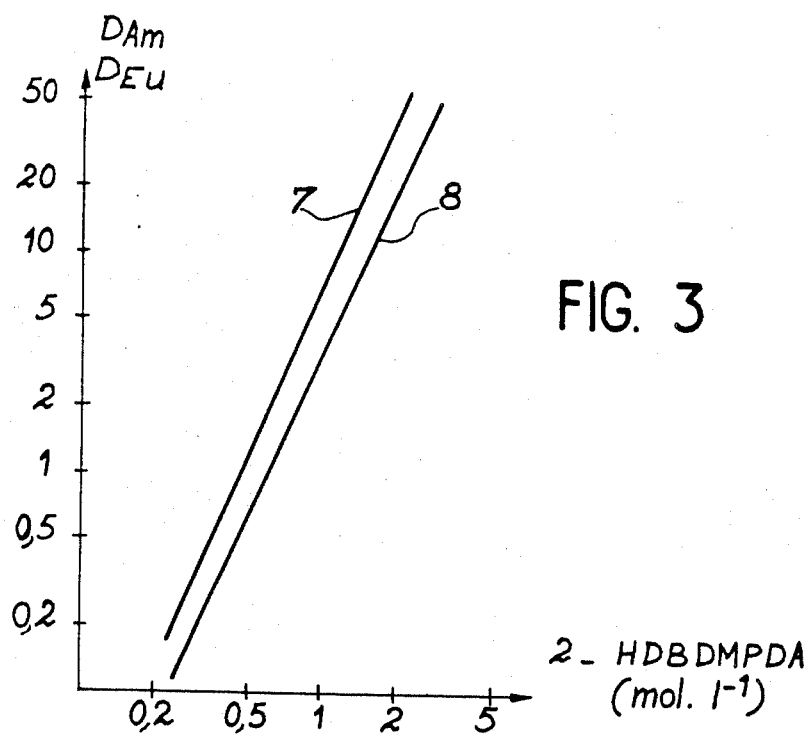
FIGS. 3 and 4. Graphs showing the variations of the distribution coefficients $D_{Am}$ of americium and $D_{Eu}$ of europium as a function of the diamide concentration of the organic phase when using as the diamide 2-hexyl-N,N'-dimethyl-N,N'-dibutyl-propane diamide (FIG. 3) and 2-ethoxyethyl-N,N'-dimethyl-N,N'-dibutyl-propane diamide (FIG. 4) and a diluent of 90% t-butyl benzene and 10% decanol, the aqueous phase being 5N nitric acid.

For the extraction, use is made of an organic phase constituted by compound 6 (2-HDBDMPDA) obtained in example 3 in a mixture of t-butyl benzene and decanol containing 10% by volume of decanol. Extraction takes place under the same conditions as those of examples 8 and 9, using organic phases having different propane diamide concentrations. The results are given in FIG. 3, which illustrates the distribution coefficient $D_{Am}$ and $D_{Eu}$ as a function of the diamide concentration of the organic phase (in mol.l−1). Line 7 relates to americium and line 8 to europium.

On the basis of these results, it can be seen that the distribution coefficient $D_{Am}$ and $D_{Eu}$ increase rapidly with the propane diamide concentration of the organic phase.

EXAMPLE 11

Figure 4:
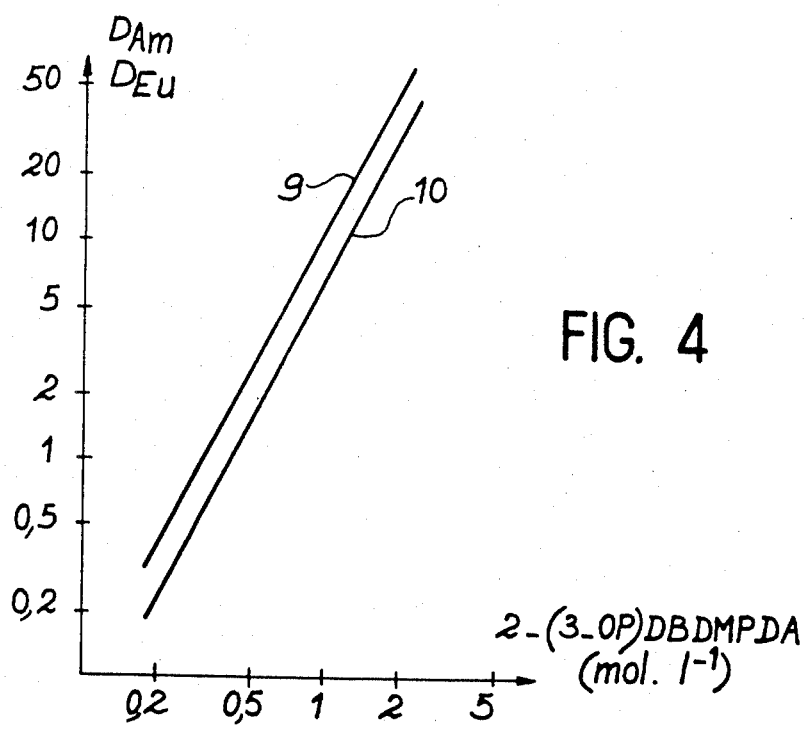

In this example, extraction takes place of the Am (III) and Eu (III) ions from an aqueous phase identical to that of example 9 using an organic phase constituted by 2-(3-OP) DBDMPDA, namely compound 8 in example 5, in a mixture of t-butyl benzene and decanol containing 10% by volume of decanol. Extraction takes place under the same conditions as in example 9 using different propane diamide concentrations in the organic phase. The results obtained are given in FIG. 4, which shows the distribution coefficients $D_{Am}$ and $D_{Eu}$ as a function of the propane diamide concentration of the organic phase.

Curve 9 relates to americium and curve 10 to europium. It can be seen that the distribution coefficients $D_{Am}$ and $D_{Eu}$ rapidly increase with the propane diamide concentration of the organic phase.

EXAMPLE 12

This example relates to the recovery of americium (III) and europium (III) from an aqueous solution identical to that of examples 10 and 11.

Figure 5:
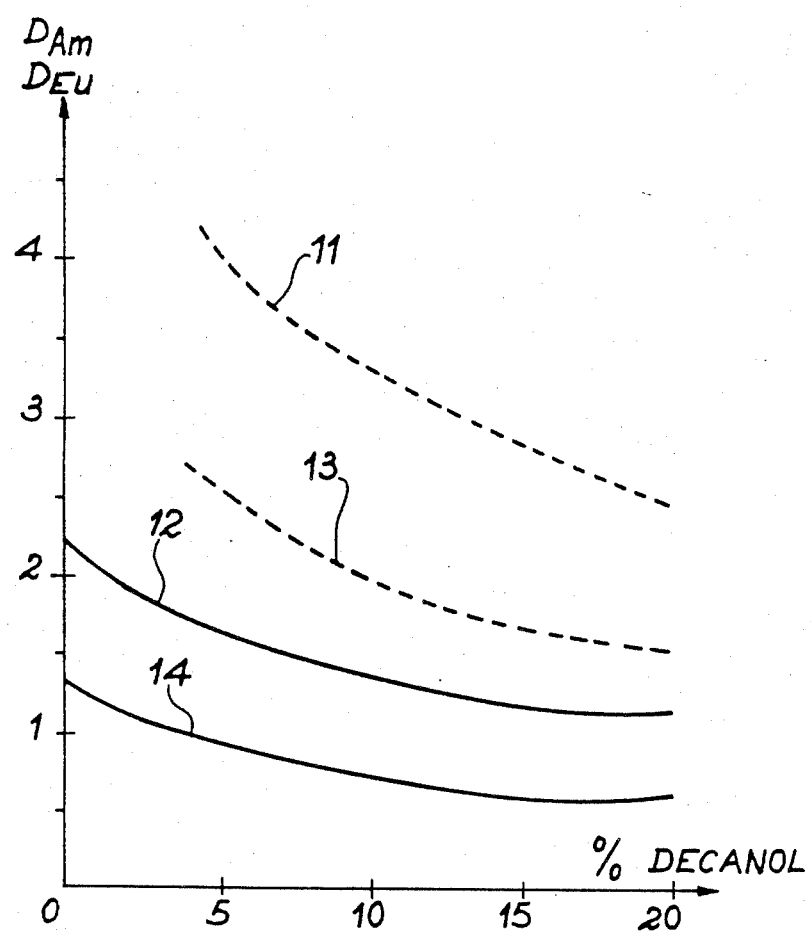
FIG. 5. A diagram showing the variations of the distribution coefficients $D_{Am}$ and $D_{Eu}$ as a function of the decanol concentration of the diluent of the organic phase.

In this example, use is made of organic phases comprising either 0.5 mol.l$^{-1}$ or 2-HDBDMPDA (compound 6) or 0,.5 mol.l$^{-1}$ of 2-(3-OP) DBDMPDA (compound 8) in a mixture of t-butyl benzene and decanol with different t-butyl benzene and decanol ratios. Extraction takes place under the same conditions as in examples 10 and 11 and the distribution coefficients of americium and europium are determined after extraction. The results obtained are given in FIG. 5 showing the distribution coefficients of americium and europium as a function of the decanol volume percentage in the organic phase.

Curve 11 relates to americium and to the propane diamide of example 5 (2-(3-OP)DBDMPDA, curve 12 relates to americium and propane diamide of example 3 (2-HDBDMPDA), curve 13 relates to europium and propane diamide of example 5 (2-(3-OP)DBDMPDA) and curve 14 relates to europium and propane diamide of example 3 (2-HDBDMPDA).

On the basis of these results, it can be seen that the distribution coefficients decrease when the decanol proportion of the organic phase increses.

EXAMPLE 13

This example studies the influence of decanol on the praseodymium nitrate limiting concentration in the organic phase, which must not be exceeded to avoid the formation of a third phase. The organic phase is constituted by the propane diamide of example 3 (21-HDBDMPDA) diluted either in pure t-butyl benzene at a concentration of 0.75 mol.l$^{-1}$, or in a mixture of t-butyl benzene and decanol containing 10% decanol or 20% decanol at a concentration of 0.625 mol.l$^{-1}$.

The praseodymium nitrate is introduced into this organic phase until a third phase appears and the limit concentration corresponding to the appearance of said third phase is plotted. The results obtained are given in the attached table.

These results show that the presence of decanol is favourable, because it delays the appearance of the third phase and makes it possible to approach the saturation of the solvent.

EXAMPLE 14

This example illustrates the recovery of americium and europium respectively present at concentrations of 10$^{-4}$ mol.l for Am(III) and 10$^{-2}$ mol.l$^{-1}$ and Eu(III) in nitric aqueous solutions of different acidities, by means of the propane diamide constituted by compound 5 (DIAM 802) of table 1.

In all cases use is made of an organic phase constituted by propane diamide DIAM 802 of the table 1 at a concentration of 0.5 mol.l$^{-1}$ in t-butyl benzene. Extraction takes place under the same conditions as in example 8 and after contacting for four minutes, the americium europium concentrations of the aqueous and organic phase are measured. The americium and europium distribution coefficients are then determined.

Figure 6:
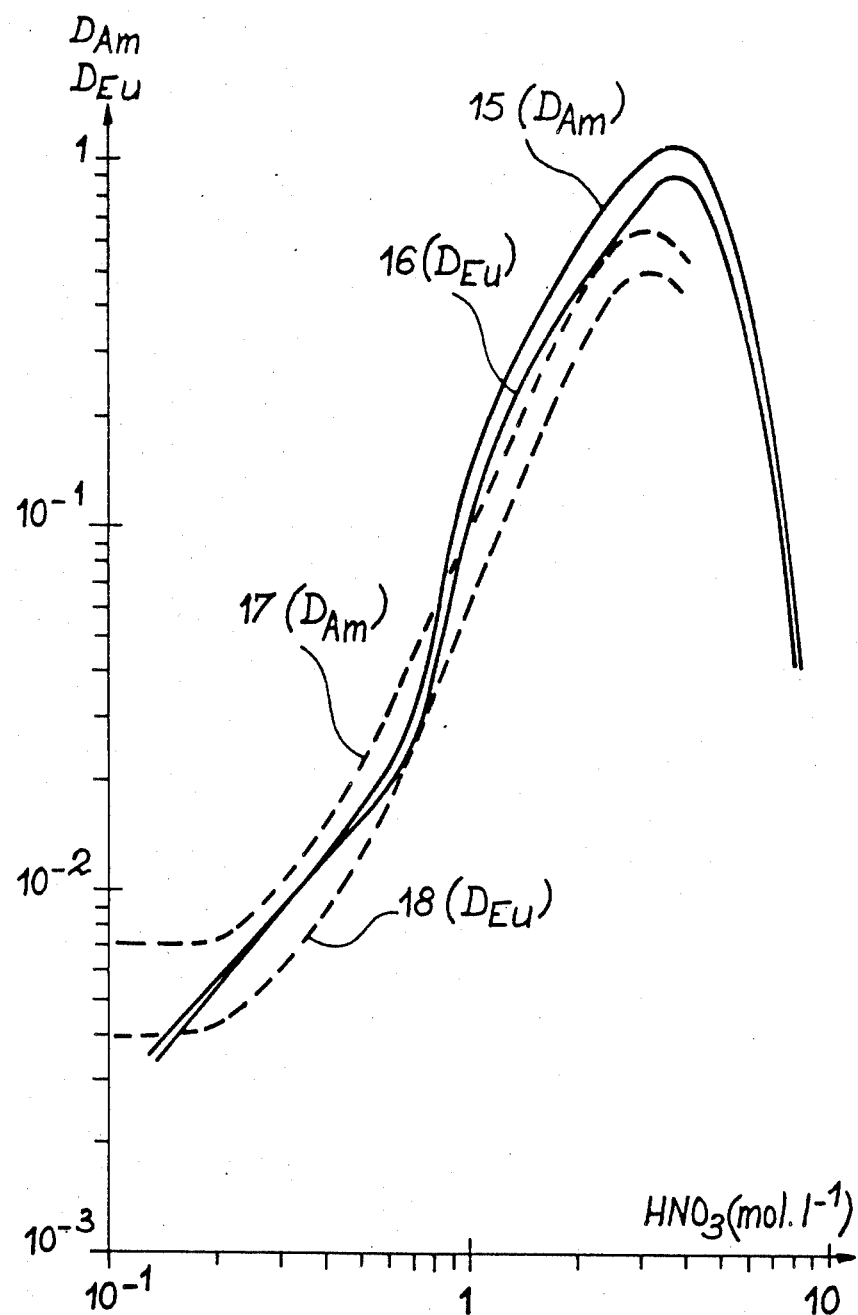
FIG. 6. A diagram showing the variations of the distribution coefficients $D_{Am}$ and $D_{Eu}$, as a function of the nitric acid concentrations of the aqueous solution to be treated, when using as the extractant N,N'-dimethyl- N,N'-diethoxyoctyl propane diamide at a concentration of 0.5 mol.l$^{-1}$ in t-butyl benzene.

The results obtained are given in FIG. 6, where curves 15 and 16 respectively illustrate the variations of $D_{Am}$ and $D_{Eu}$ as a function of the nitric acid concentration of the aqueous phase (in mol.l$^{-1}$).

The dotted line curves 17 and 18 illustrate the results obtained with respect to the distribution coefficient of americium (curve 17) and the distribution coefficient of europium (curve 18), when extraction is carried out under the same conditions using the prior art N,N'-dimethyl-N,N'-dioctyl-propane diamide.

These results show that the americium and europium distribution coefficients are higher with the propane diamide according to the invention.

EXAMPLE 15

This example illustrates the recovery of americium and europium respectively present at concentrations of 10$^{-4}$ mol.l$^{-1}$ for Am(III) and 10$^{-2}$ mol.l$^{-1}$ for Eu(III) in nitric aqueous solutions of different acidities by means of the propane diamide constituted by compound 11 of table 2 of formula:

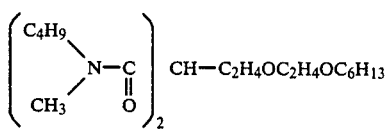

hereinafter referred to as 2-(3,6-OD) DBDMPDA.

In all cases, use is made of an organic phase constituted by (2-(3,6,OD) DBMPDA at a concentration of 0.5 mol.l$^{-1}$ in t-butyl benzene. Extraction takes place under the same conditions as those of example 8 and after 4 minutes contacting, the americium and europium concentrations of the aqueous and organic phases are measured. The americium and europium distribution coefficients are then determined.

Figure 7:
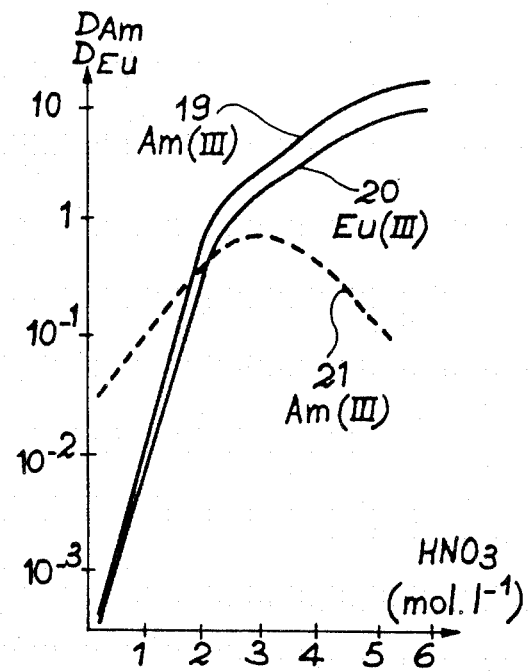
FIG. 7. A graph showing the variations of the distribution coefficients $D_{Am}$ and $D_{Eu}$ as a function of the nitric acid concentration of the aqueous solution to be treated, when using as the extractant (2-(3,6-OD)DBDMPDA.

The results obtained are given in FIG. 7, wherein curves 19 and 20 respectively illustrate the variations of $D_{Am}$ and $D_{Eu}$ as a function of the nitric acid concentration of the aqueous phase (in mol.l$^{-1}$) and the dotted line curve 21 illustrates the variations of $D_{Am}$ as a function of the nitric acid concentration of the aqueous phase, when using the prior art propane diamide (DODMPDA) instead of compound 11 under the same conditions.

Under the same extraction conditions, use was also made of compounds 14 and 15 of table 2 and identical results were obtained.

EXAMPLE 16

This example illustrates the use of dipropane diamide constituted by compound 13 of example 7 for the extraction of americium (III) and europium (III). In this example, use is made of a 4N nitric acid solution containing americium and europium and an organic phase constituted by compound 13 at a concentration of 0.5 mol.l$^{-1}$ in t-butyl benzene.

Extraction takes place under the same conditions as those of example 8 and after 4 minutes contacting, measurement takes place of the europium concentration of the organic and aqueous phases. Thus, the distribution coefficient of europium $D_{Eu}$ is determined and is equal to 2.3. Thus, compound 33 also gives good results for the recovery of europium.

EXAMPLE 17

This example illustrates the use of compound 11 of table 2 for the extraction of different metals such as U(VI), Pu(IV), Ar(IV), Fe(III) and Nb(V), from nitric solution containing 10$^{-2}$ mol.l$^{-1}$ of said metals.

Extraction takes place using aqueous phases of different acidities and an organic phase constituted by compound 11 of table 2 of example 6 at a concentration of 0.5 mol.l$^{-1}$ in t-butyl benzene.

Extraction takes place under the same conditions as those of example 8 and after 4 minutes contacting, measurement takes place of the metal concentrations of the aqueous and organic phases. The distribution coefficients of the different metals are then determined.

Figure 8:
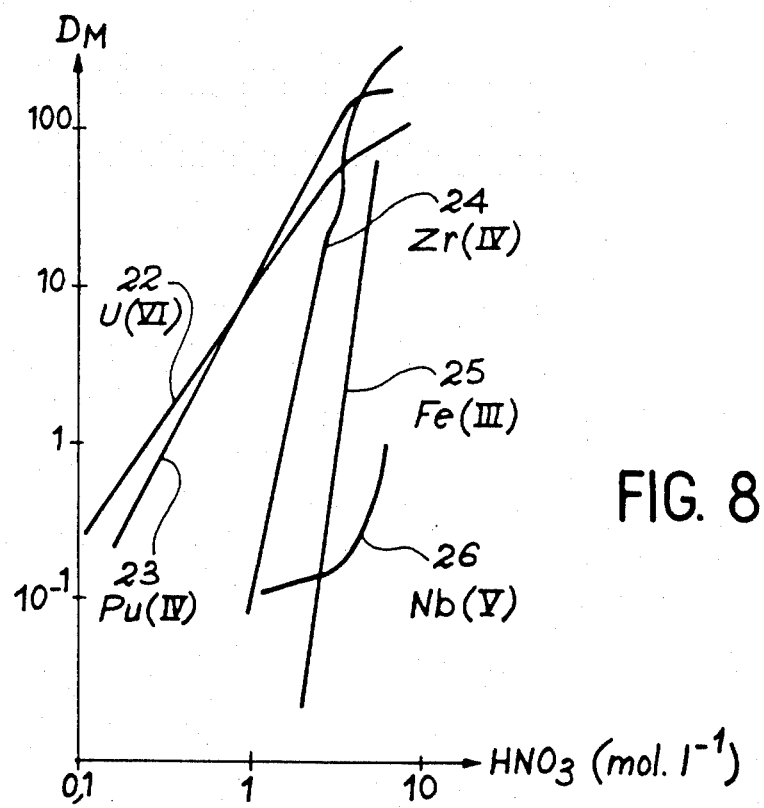
FIG. 8. A graph showing the variations of the distribution coefficients $D_U$, $D_{Pu}$, $D_{Zr}$, $D_{FE}$ and $D_{Nb}$ as a function of the nitric acid concentration of the aqueous solution, when using as the extractant the propane diamide according to the invention constituted by compound 11.

The results obtained are given in FIG. 8, where curves 22, 23, 24, 25 and 26 respectively illustrate the variations of $D_U$, $D_{Pu}$, $D_{Zr}$, $D_{Fe}$ and $D_{Nb}$ as a function of the nitric acid concentration of the aqueous phase (in mol.l$^{-1}$).

It is clear that this propane diamide is suitable for the extraction of the different metals and that by choosing an appropriate acidity, it makes it possible to separate zirconium from niobium under good conditions.

On starting with an aqueous acid solution of Sr$^{2+}$ and carrying out extraction using the same organic phase and the same conditions as hereinbefore, a distribution coefficient $D_{Sr}$ is obtained for strontium, which is below 10$^{-3}$.

TABLE

| Extractant | Diluent | Appearance of the third phase | % Saturation of the solvent |
|---|---|---|---|
| 0.75 M 2-hexyl N,N'—dibutyldimethylpropane diamide (2-HDBDMPDA) | t-butylbenzene | 0.075 M Pr(NO$_3$)$_3$ | 20% |
| 0.625 M 2-HDBDMPDA | t-butylbenzene + 10% decanol | 0.17 M Pr(NO$_3$)$_3$ | 50% |
| 0.625 M 2-HDBDMPDA | t-butylbenzene + 20% decanol | 0.218 M Pr(NO$_3$)$_3$ | 70% |

What is claimed is:

1. An extracting agent comprising a diluent and diamide of formula:

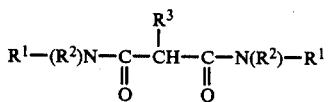 (I)

in which R$^1$ and R$^2$, which can be the same or different, represent a straight or branched alkyl radical with 1 to 15 carbon atoms or a radical of formula:

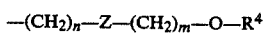

in which R$^4$ is an alkyl radical with 1 to 6 carbon atoms, n is equal to 0 or is an integer ranging between 1 and 6, Z is a single bond or an oxygen atom and m is an integer ranging from 1 to 6, provided that Z is a single bond when n is equal to 0 and R$^3$ represents a hydrogen atom, an alkyl radical with 1 to 15 carbon atoms, a radical of formula:

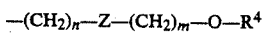

in which n, m, Z and R$^4$ have the meanings given hereinbefore, or a radical of formula:

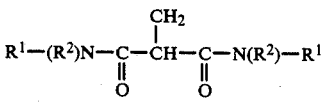

in which R$^1$ and R$^2$ have the meanings given hereinbefore, provided that R$^3$ does not represent a hydrogen atom when R$^1$ and R$^2$ both represent an alkyl radical.

2. An extracting agent according to claim 1, wherein R$^1$ is the methyl radical.

3. An extracting agent according to claims 1 or 2, wherein at least one of the radicals R$^2$ and R$^3$ is in accordance with the formula:

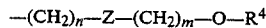

in which n, m, Z and R$^4$ have the meanings given in claim 1.

4. An extracting agent according to claim 2, wherein R$^2$ is an alkyl radical and R$^3$ the radical of formula:

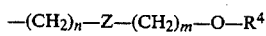

in which n, m, Z and R$^4$ have the meanings given in claim 1.

5. An extracting agent according to claim 3, wherein n is equal to 0, Z is a single bond, m is equal to 1, 2 or 3 and R$^4$ is an alkyl radical with 2 to 6 carbon atoms.

6. An extracting agent according to claim 3, wherein n is equal to 2, Z represents an oxygen atom, m is equal to 2 and R$^4$ is an alkyl radical with 2 to 6 carbon atoms.

7. An extracting agent according to claim 1, wherein R$^1$ is the methyl radical, R$^2$ the butyl radical and R$^3$ the hexyl radical.

8. An extracting agent according to claim 1, wherein R$^1$ is the methyl radical, R$^2$ is the butyl radical and R$^3$ is the radical —C$_2$H$_4$—O—C$_2$H$_5$.

9. A diamide of formula:

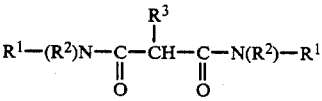 (I)

in which R$^1$ and R$^2$, which can be the same or different, represent a straight or branched alkyl radical having 1 to 15 carbon atoms or a radical of formula:

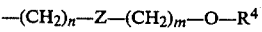

in which R$^4$ is an alkyl radical with 1 to 6 carbon atoms, n is equal to 0 or is an integer ranging between 1 and 6, Z is a single bond or an oxygen atom and m is an integer ranging between 1 and 6, provided that Z is a single bond when n is equal to 0 and R$^3$ represents a hydrogen atom, an alkyl radical with 1 to 15 carbon atoms or a radical of formula:

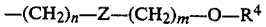

in which n, m, Z and R$^4$ have the meanings given hereinbefore, provided that R$^3$ does not represent a hydrogen atom or an alkyl radical having 1 to 3 carbon atoms when $R^1$ and $R^2$ both represent an alkyl radical.

10. A diamide according to claim 9, wherein at least one of the radicals $R^1$, $R^2$ and $R^3$ is in accordance with the formula:

$$-(CH_2)_n-Z-(CH_2)_mOR^4$$

in which n, m, Z and $R^4$ have the meanings given in claim 1.

11. A diamide according to claim 10, wherein $R^1$ is the methyl radical, $R^2$ is the octoxyethyl radical and $R^3$ is a hydrogen atom.

12. A diamide according to claim 10, wherein $R^1$ is the methyl radical, $R^2$ is the butyl radical and $R^3$ is a radical chosen from among the ethyoxyethyl, butoxyethyl, hexoxyethyl and hexoxyethoxyethyl radicals.

13. A diamide according to claim 10, wherein $R^1$ is the methyl radical, $R^2$ is the octyl radical and $R^3$ is the hexoxyethyl radical.

14. A diamide according to claim 9, wherein $R^1$ is the methyl radical, $R^2$ is the butyl radical and $R^3$ is the butyl or hexyl radical.

* * * * *